US009483186B1

(12) United States Patent
Lewis et al.

(10) Patent No.: US 9,483,186 B1
(45) Date of Patent: Nov. 1, 2016

(54) SELECTABLE POLICIES FOR IDENTIFIABLE STORAGE COMMAND STREAMS

(71) Applicant: EMC Corporation, Hopkinton, MA (US)

(72) Inventors: Daniel B. Lewis, Newton, MA (US); Bruce A. Zimmerman, Concord, MA (US); Michael Allexenberg, Northborough, MA (US); Benal Owens, Jr., Cary, NC (US); John R. Bayle, Marlborough, MA (US); Abhaya Pattanaik, Westborough, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 14/674,667

(22) Filed: Mar. 31, 2015

(51) Int. Cl.
*G06F 3/00* (2006.01)
*G06F 12/00* (2006.01)
*G06F 13/28* (2006.01)
*G06F 3/06* (2006.01)

(52) U.S. Cl.
CPC .............. *G06F 3/061* (2013.01); *G06F 3/067* (2013.01); *G06F 3/0659* (2013.01); *G06F 3/0689* (2013.01)

(58) Field of Classification Search
None
See application file for complete search history.

(56) References Cited

U.S. PATENT DOCUMENTS

| 6,192,432 B1* | 2/2001 | Slivka | G06F 12/0804 707/E17.01 |
| 7,460,672 B2* | 12/2008 | Klein | G06F 21/6218 380/278 |
| 7,552,294 B1* | 6/2009 | Justiss | G06F 11/1456 711/154 |
| 2010/0146582 A1* | 6/2010 | Jaber | G06F 21/6218 726/1 |

* cited by examiner

*Primary Examiner* — David E Martinez
(74) *Attorney, Agent, or Firm* — BainwoodHuang

(57) ABSTRACT

A method performed by a data storage system includes (a) receiving a set of data storage commands directed to the data storage system, (b) identifying that a subset of the set of received data storage commands satisfies a pre-defined pattern, and (c) in response to identifying, applying a policy associated with the pre-defined pattern to fulfillment of the data storage commands of the subset. The pre-defined pattern (e.g., detecting SCSI Extended Copy commands directed at logical block addresses that are close to each other as part of a single stream) and its associated policy (e.g., serializing the SCSI Extended Copy commands of the stream, and preferably executing them in order by address) may be pre-programmed into the data storage system at configuration time, or the pre-defined patterns and associated policies may be input by a user at any time.

21 Claims, 4 Drawing Sheets

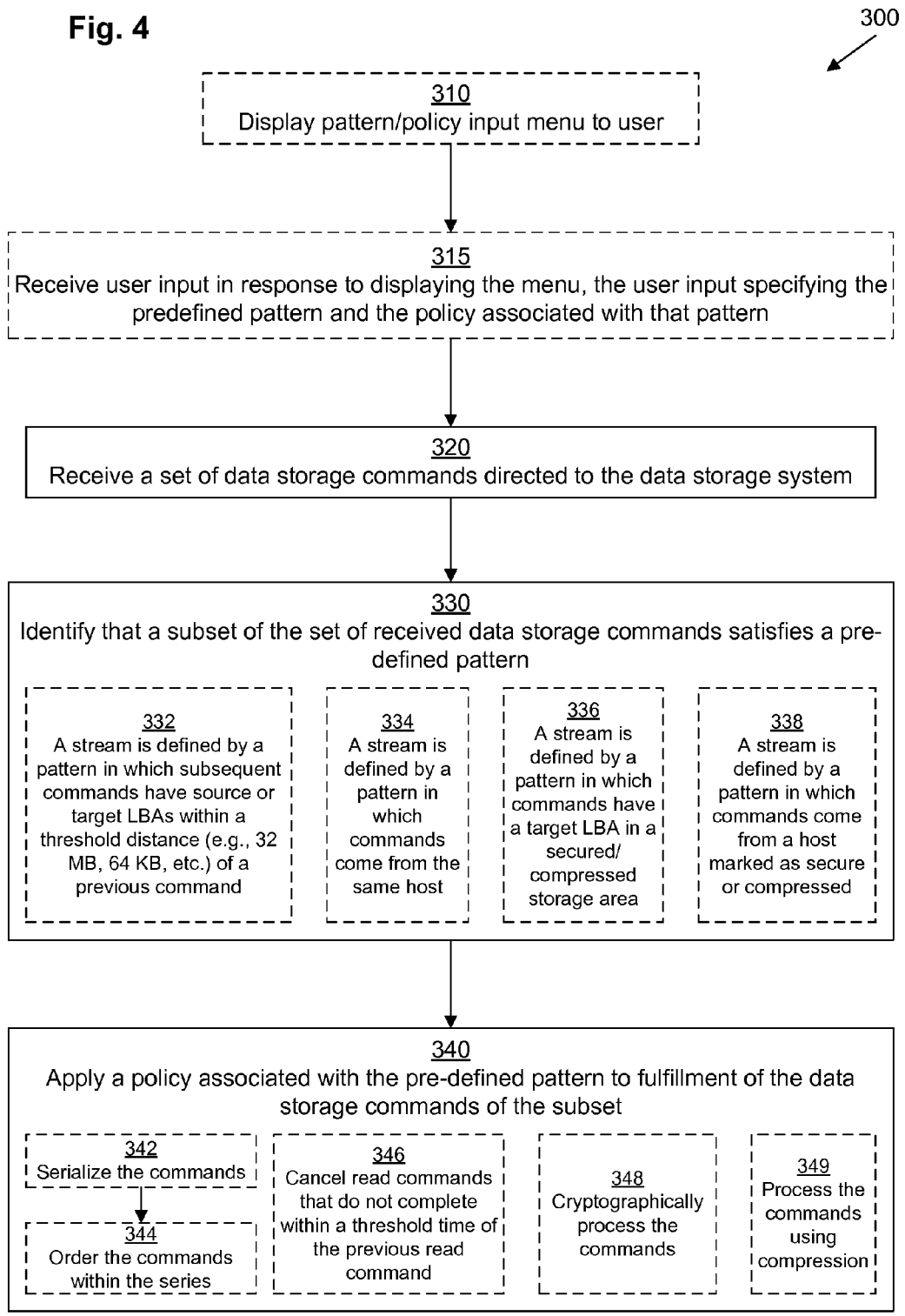

SELECTABLE POLICIES FOR IDENTIFIABLE STORAGE COMMAND STREAMS

BACKGROUND

Data storage systems are often used to store large quantities of data with fast access times. A typical data storage system is housed in a cabinet and includes one or more storage processors coupled to a large quantity of hard drives over a storage interconnect. The data storage system typically connects over a storage network to one or more host devices that are configured to issue storage commands to the data storage system over the storage network. Such data storage systems are often used in connection with large databases as well as with virtual machines for cloud computing.

SUMMARY

Unfortunately, the above-described conventional systems suffer from deficiencies. A typical conventional data storage system is designed to operate according to certain principles that tend to benefit certain common patterns of demand. For example, many conventional data storage systems include read-ahead caches that increase efficiency when sequential read operations are received. Many conventional data storage systems include storage processors that are designed to process data storage commands approximately in the order in which they were received. Furthermore, storage processors, especially those utilizing multi-core processors, are designed to perform several data storage commands in parallel. Thus, some data storage systems are configured to operate in a multi-threaded manner, which benefits performance when data storage operations that are distributed across the array are done. However, in certain less-common situations, performing storage commands in parallel can cause a large performance drop due to sequential storage operations being broken up.

For example, some cloud-based virtual machine managers are able to copy an entire virtual machine image from one portion of storage to another as part of a migration or cloning operation. This is often accomplished by a virtual machine manager application running on a host breaking up the copy operation into 32 megabyte (MB) chunks, and simultaneously issuing eight 4-MB SCSI Extended Copy commands to a data storage system. Each 4-MB SCSI Extended Copy command is typically divided up into a set of smaller operations, all of which are directed at a source of 4 MB of contiguous storage, having consecutive logical block addresses, and a target of 4 MB of contiguous storage, also having consecutive logical block addresses. However, if the eight SCSI Extended Copy commands are processed in parallel, then it is possible that, since all of the source data likely resides on the same disk or array of disks, each of which can only access a single address at once, there will be many random seek operations as the disk(s) shuffles back and forth between the constituent operations of the eight SCSI Extended Copy commands. Similar delays may occur on the target disk(s). In addition, even though data storage systems typically perform read-ahead caching, the benefit of reading ahead may be reduced or eliminated by the constant switching between different parts of the disk(s). In a worst-case scenario, performing eight 4-MB SCSI Extended Copy commands may take several seconds, bogging down performance of the entire data storage system.

Thus, it would be desirable to avoid the large performance penalty caused by performing these related SCSI Extended Copy commands in parallel on a storage processor of a data storage system configured to execute threads in parallel. It would also be desirable to avoid performance penalties in other, similar situations. This may be accomplished by performing a stream identification operation to detect a pattern in the receipt of data storage commands indicative of a single stream of related commands, such as SCSI Extended Copy commands for a single virtual machine migration or cloning operation. Then, a specified policy, such as serialization of the SCSI Extended Copy commands within the identified stream, can be applied to eliminate the performance penalty.

One embodiment of the improved techniques is directed to a method performed by a data storage system. The method includes (a) receiving a set of data storage commands directed to the data storage system, (b) identifying that a subset of the set of received data storage commands satisfies a pre-defined pattern, and (c) in response to identifying, applying a policy associated with the pre-defined pattern to fulfillment of the data storage commands of the subset. The pre-defined pattern (e.g., detecting SCSI Extended Copy commands directed at logical block addresses that are close to each other as part of a single stream) and its associated policy (e.g., serializing the processing of the SCSI Extended Copy commands of the stream, and preferably executing them in order by address) may be pre-programmed into the data storage system at configuration time, or the pre-defined patterns and associated policies may be input by a user at any time. Other embodiments are directed to a system, a computerized apparatus, and a computer program product for performing methods of providing access to a protected resource similar to those described above.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

FIG. 4 is a flowchart depicting an example method according to various embodiments.

DETAILED DESCRIPTION

Embodiments are directed to techniques for identifying streams of related data storage operations and applying specialized policies to those streams. In some situations this may allow for optimized performance, while in others it may allow for flexibility in features.

Figure 1:
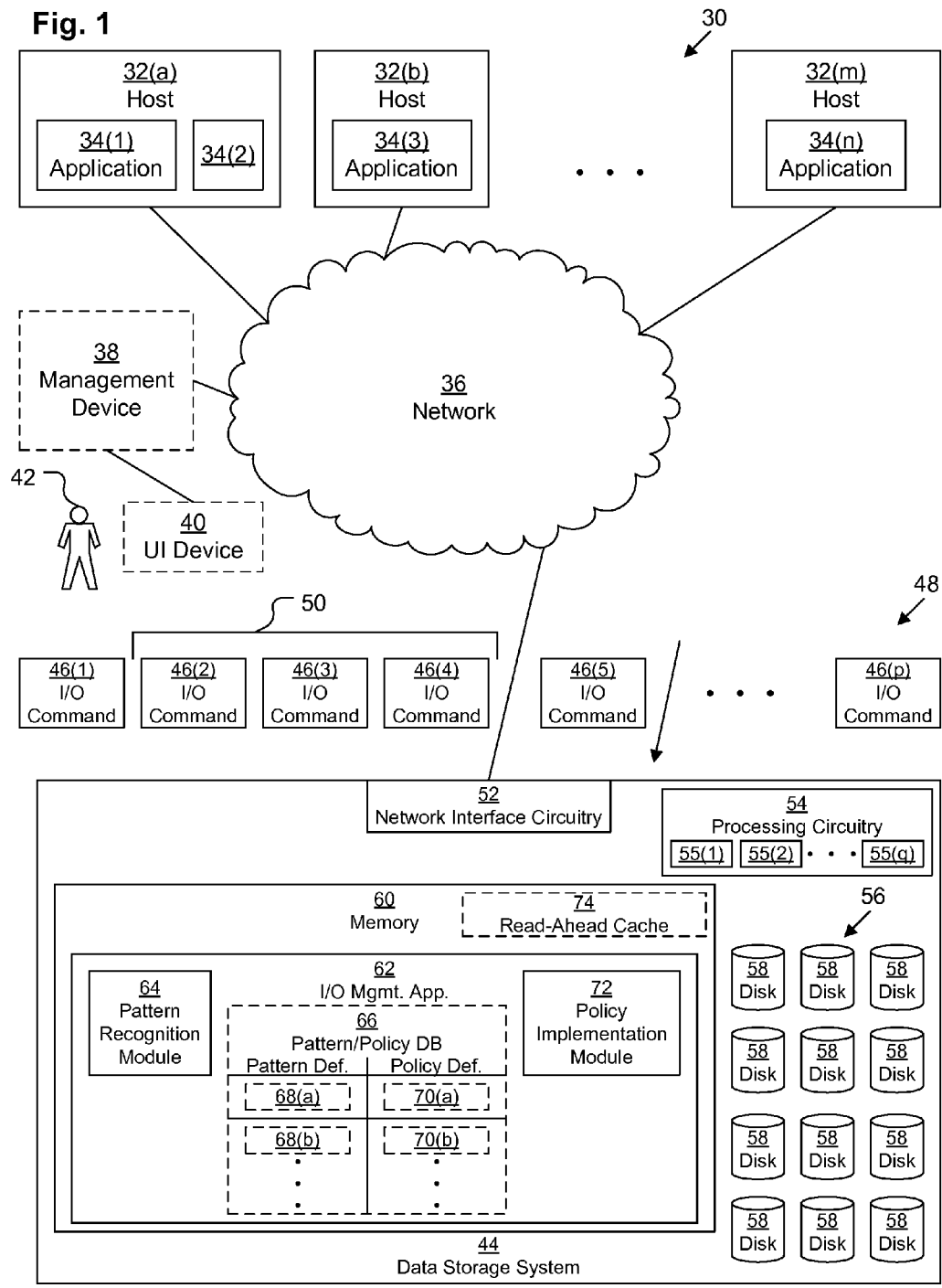
FIG. 1 is a block diagram depicting an example system for use in connection with various embodiments, the example system including an example apparatus according to various embodiments.

FIG. 1 depicts an example system 30 in which improved techniques hereof may be practiced. System 30 includes one or more hosts 32 (depicted as hosts 32(a), 32(b), . . . , 32(m)) that run a collection of applications 34 (depicted as applications 34(1), 34(2), 34(3), . . . , 34(n)) connected to a data storage system 44 over network 36. In some embodiments, a management device 38 is also connected to network 36.

Hosts 32 may be any kind of computing devices capable of functioning in a server capacity, such as, for example, a personal computer, a workstation, a server, an enterprise server, etc. Applications 34 run on hosts 32 to provide services to clients using data storage provided by the data storage system 44. As depicted, some hosts 32 may run one application 34 (e.g., host 32(*b*) runs application 34(3)), while other hosts may run several applications 34 (e.g., host 32(*a*) runs applications 34(1) and 34(2)).

Network 36 may be any kind of network, such as, for example, a local area network, a wide area network, the Internet, a storage area network, a fabric of interconnected hubs and switches, etc. In some embodiments, in lieu of a network, direct point-to-point connections may be used.

Management device 38 may be any kind of computing device, such as, for example, a personal computer, a workstation, a server, a smart phone, a tablet computer, a handheld computer, a laptop computer, a smart watch, a wearable computer, etc. Management device 38 interfaces with a user 42 via one or more user interface (UI) devices 40 to allow the user to manage aspects of the data storage system 44. In some embodiments, a UI device 40 may be external to the management device, as depicted. In other embodiments (not depicted), a UI device 40 may be incorporated into the management device 38 itself (e.g, a touchscreen is incorporated into a cellular phone).

The applications 34 running on the hosts 32 may collectively send a set 48 of data storage input/output (I/O) commands 46 (depicted as I/O commands 46(1), 46(2), 46(3), 46(4), 46(5), . . . , 46(*p*)) to the data storage system 44 for fulfillment. Certain ones of these I/O commands 46 may be considered to be related in a stream 50. Thus, as depicted, I/O commands 46(2), 46(3), 46(4) are related to each other and are all part of a stream 50, which is a subset of set 48. The I/O commands 46 within stream 50 may be related to each other in various ways, as will be discussed in detail below.

Data storage system (DSS) 44 is a data storage array, such as, for example, a VNX®, VNXe®, or CLARiiON® CX4 data storage array provided by the EMC Corporation of Hopkinton, Mass. It should be understood, however, that, in some embodiments, DSS 44 may be any kind of computing device that provides storage, such as, for example, a personal computer, a workstation computer, a server computer, an enterprise server computer, a laptop computer, etc. DSS 44 includes network interface circuitry 52, processing circuitry 54, a set 56 of disks 58, and memory 60.

Network interface circuitry 52 may include one or more Ethernet cards, cellular modems, Wireless Fidelity (WiFi) wireless networking adapters, any other devices for connecting to a network (e.g., network 36), or some combination thereof.

Processing circuitry 54 may be any kind of processor or set of processors configured to perform operations, such as, for example, a microprocessor, a multi-core microprocessor, a digital signal processor, a system on a chip, a collection of electronic circuits, a similar kind of controller, or any combination of the above. Processing circuitry 54 may also include circuitry configured to control the disks 58. As depicted, processing circuitry 54 includes multiple processing cores 55 (depicted as cores 55(1), 55(2), . . . , 55(*q*)), each of which is able to perform a different thread of execution simultaneously. Thus, data storage system 44 is able to process several different I/O commands 46 at once in parallel. In a typical arrangement, processing circuitry 54 may be arranged as a set of multi-core storage processors on one or more boards within a cabinet.

The set 56 of disks 58 may be arranged as one or more arrays of disks 58, such as a collection of Redundant Array of Independent Disks (RAID) sets. In a typical arrangement, the disks 58 are distributed within several shelves within the cabinet. For example, in one embodiment, each shelf may hold up to 120 disks 58, and there may be up to 22 shelves of disks 58 within the cabinet, allowing up to 2,640 disks 58 within DSS 44. Disks 58 may include magnetic hard disks as well as solid-state storage drives or some combination thereof as is well-known in the art. Disks 58 may connect to the processing circuitry 54 over one or more high-speed storage interconnects (not depicted), such as Fiber Channel. Disks 58 may be arranged to include a collection of logical volumes, each of which may extend across several disks 58, e.g., in a RAID configuration.

Memory 60 may be any kind of digital system memory, such as, for example, random access memory (RAM). Memory 60 stores an operating system in operation (not depicted, e.g., Linux, UNIX, Windows, or a similar operating system), various storage system management programs in operation (not depicted), and one or more applications executing on processing circuitry 54 as well as data used by those applications.

In some embodiments, memory 60 includes a Read-Ahead Cache portion 74, which typically includes high-speed cache memory configured to fetch and store extended segments of data from disks 58. Thus, when a block of data is requested from a logical address of a logical volume of the DSS 44, in addition to fetching just that one block of data from a disk 58, the Read-Ahead cache 74 may also fetch several additional blocks of data having subsequent logical addresses immediately after the requested logical address. This provides optimization for applications that often access data sequentially since only one high latency disk access is needed, but the data remains in the high-speed Read-Ahead cache 74.

Memory 60 stores an I/O management application 62 while it operates on processing circuitry 54. In some embodiments, I/O management application may also be stored on persistent storage (e.g., on a disk 58) so that it may be loaded into memory 60 upon a restart of the DSS 44. I/O management application 62 is configured to receive I/O commands 46 and to process them with respect to the disks 58. Thus, for example, I/O management application 62 processes read, write, copy, formatting, encryption, compression, volume creation, and volume deletion operations, among other common data storage operations.

I/O management application 62 also includes a pattern recognition module 64 and a policy implementation module 72. In some embodiments, pattern recognition module 64 is configured to recognize a single pattern within I/O commands in order to identify a stream 50 of related I/O commands 46. In some embodiments, this single pattern may be hard-coded into the pattern recognition module 64 or programmed into the pattern recognition module 64 at a configuration time of the DSS 44. In other embodiments, pattern recognition module 64 is configured to be able to recognize any of a set of pattern definitions 68 stored within a pattern/policy database (DB) 66. In some embodiments, the pattern definitions 68 may programmed into the pattern/policy DB 66 at a configuration time of the DSS 44, while in other embodiments the pattern definitions 68 may be defined by the user 42 via a menu displayed by management device 38 on UI device 40.

In some embodiments, policy implementation module 72 is configured to apply a specific policy to the fulfillment of related I/O commands 46 within a stream 50. In some embodiments, this policy may be hard-coded into the policy implementation module 72 or programmed into the policy implementation module 72 at a configuration time of the DSS 44. In other embodiments, policy implementation module 72 is configured to be able to select a particular policy definition 70 associated with the pattern definition 68 that defines a particular stream 50 with reference to pattern/policy database (DB) 66. In some embodiments, the policy definitions 70 may programmed into the pattern/policy DB 66 at a configuration time of the DSS 44, while in other embodiments the policy definitions 70 may be defined by the user 42 via a menu displayed by management device 38 on UI device 40. Various examples of particular pattern definitions 68 and their associated policy definitions 70 is provided below in further detail.

Figure 2:
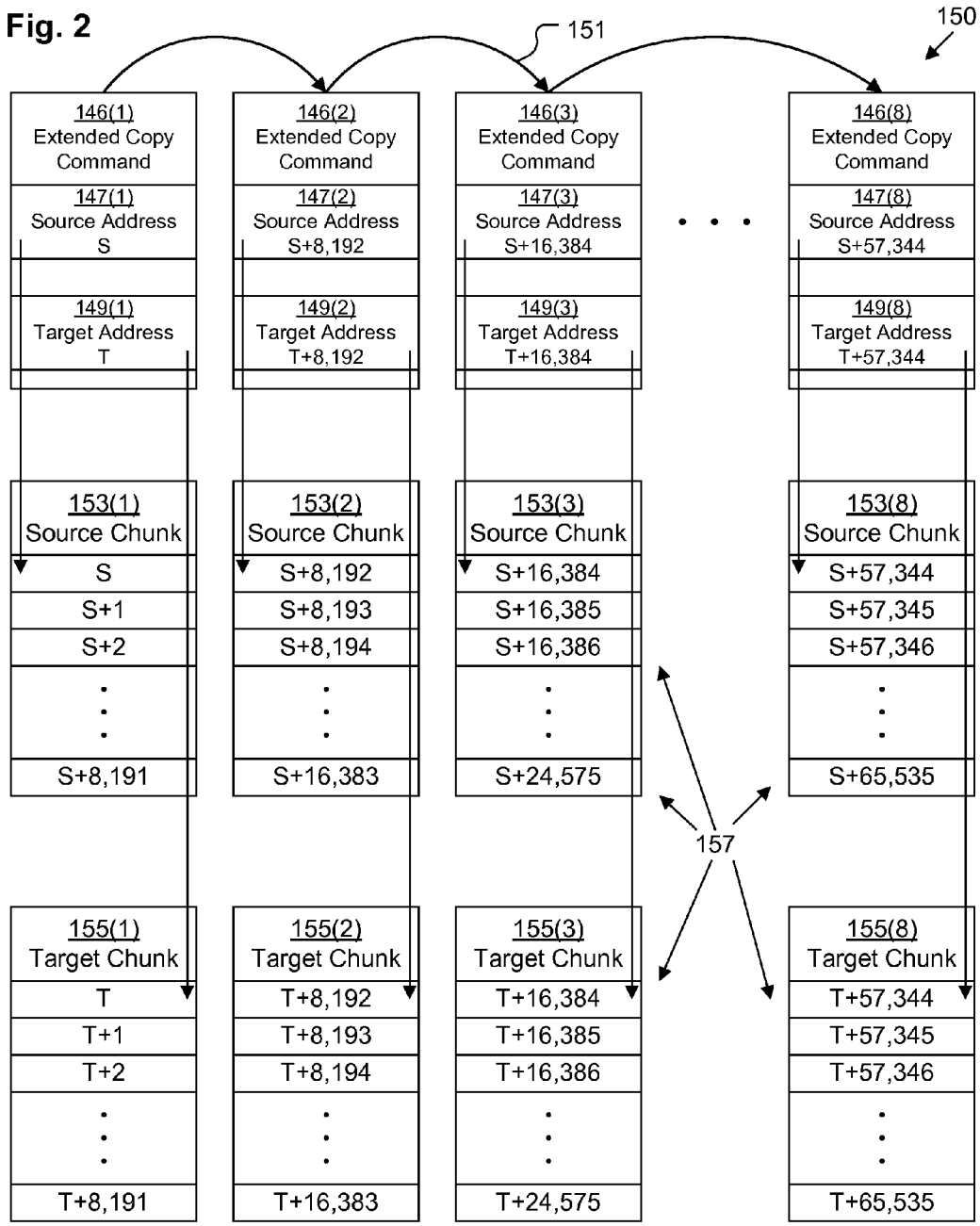
FIG. 2 is a block diagram depicting an example serialization of SCSI Extended Copy commands of a single stream according to various embodiments.

FIG. 2 depicts an example 150 stream 50. In the context of an application 34 managing a set of virtual machines (VMs) that are stored on DSS 44, a user may desire to clone or migrate a VM within the DSS 44. In order to fulfill that request, the application 34 may instruct the DSS 44 to copy data of the VM from a source location on disks 58 to a target location on disks 58 by breaking the VM data into 32-MB chunks, and further breaking each of those into eight 4-MB source chunks 153(1), 153(2), 153(3), . . . , 153(8). Then, the application may simultaneously or close to simultaneously issue eight SCSI Extended Copy commands 146(1), 146(2), 146(3), . . . , 146(8), each of which instructs the DSS 44 to copy from a respective source chunk 153 at a respective source address 147 to a respective target chunk 155 at a respective target address 149.

As depicted, the first SCSI Extended Copy command 146(1) includes a first source address 147(1), which may be a logical block address S on a particular logical volume (or disk 58 if RAID is not used and the disks 58 are not partitioned) of the first block 157 of first source chunk 153(1) from which data is to be copied. Since there are 8,192 512-byte blocks in 4 MB, first source chunk 153(1) is made up of blocks 157 with addresses ranging from S through S+8,191, assuming that the first source chunk 153(1) is sequential and contiguous. Typically, not only is each source chunk 153 internally contiguous and sequential, but the various source chunks 153(1), 153(2), 153(3), . . . , 153(8) are also sequential and contiguous with respect to each other. Thus, second source chunk 153(2) is made up of blocks 157 with addresses ranging from S+8,192 through S+16,383, third source chunk 153(3) is made up of blocks 157 with addresses ranging from S+16,384 through S+24,575, and eighth source chunk 153(8) is made up of blocks 157 with addresses ranging from S+57,344 through S+65,535, etc.

Similarly, the first SCSI Extended Copy command 146(1) includes a first target address 149(1), which may be a logical block address T on another particular logical volume (or disk 58 if RAID is not used and the disks 58 are not partitioned) of the first block 157 of first target chunk 155(1) to which data is to be copied. Since there are 8,192 512-byte blocks in 4 MB, first target chunk 155(1) is made up of blocks 157 with addresses ranging from T through T+8,191, assuming that the first target chunk 155(1) is sequential and contiguous. Typically, not only is each target chunk 155 internally contiguous and sequential, but the various target chunks 155(1), 155(2), 155(3), . . . , 155(8) are also sequential and contiguous with respect to each other. Thus, second target chunk 155(2) is made up of blocks 157 with addresses ranging from T+8,192 through T+16,383, third target chunk 155(3) is made up of blocks 157 with addresses ranging from T+16,384 through T+24,575, and eighth target chunk 155(8) is made up of blocks 157 with addresses ranging from T+57,344 through T+65,535, etc.

It should be noted that, in some embodiments, instead of each SCSI Extended Copy command 146 including a single source address 147 and a single target address 149, one or more of the SCSI Extended Copy commands 146 may include a plurality of source addresses 147 and target addresses 149, each referring to different subsets (as small as 1 block in size or larger) of the source chunk 153 or target chunk 155 respectively.

It should be understood that because all eight SCSI Extended Copy commands 146 are typically issued at once, the DSS 44 will typically receive them all at approximately the same time, and it will schedule them for fulfillment. Typically, a storage command 46 received by the DSS 44 is scheduled for fulfillment by operation of various threads running on different cores 55 of processing circuitry 54. However, were that to be done for these eight SCSI Extended Copy commands 146, each SCSI Extended Copy command 146 would likely execute in parallel on a separate core 55. For the first SCSI Extended Copy command 146 to be scheduled (let us assume that it is the first SCSI Extended Copy command 146, although this may not always be the case), its respective core (e.g., first core 55(1)) will begin to read the data from source chunk 153(1). Typically, however, first core 55(1) will not issue a read command to read the entire source chunk 153(1) all at once, but rather, the first core 55(1) will first issue an initial read command to read an initial subset of the source chunk 153(1). Thus, in one embodiment, the read commands are broken down into subsets having a size of 256 KB, so the first core 55(1) will read 512 blocks 157 having addresses S through S+511. If the logical source volume is configured as a RAID-5 array having five disks, then each stripe across the array will have five strides (also referred to as stripe units), four of which will contain data, and one of which will contain parity. If the logical source volume is configured to use 64-KB strides, then each stripe will contain 320 KB, of which 256 KB will be data. Thus, in such a configuration it makes sense to issue read commands for 256 KB at a time. However, in other arrangements, other read sizes may be used.

When the first core 55(1) issues the first read command, there will be a delay as the various disks of the logical source volume spin to the appropriate locations. For a typical hard disk, this may take an average of 10 milliseconds (ms). Thus, while the disks 58 are accessing the data, the thread on the first core 55(1) will be put to sleep, and another thread may begin to execute on that core 55(1). In addition, other threads may already be executing on the other cores 55. When a thread assigned to the second SCSI Extended Copy command 146 (e.g., SCSI Extended Copy command 146(2)) begins to execute, its respective core will issue a read command for a subset of the second source chunk 153(2). However, since the second source address 147(2) is most likely on the same physical disks 58 as the first source address 147(1), the thread assigned to the second SCSI Extended Copy command 146(*b*) will stall since the first thread is already accessing the same disks. There may be latency of close to 20 ms as the second thread must wait for the first read operation to complete (~10 ms) as well as for the second read operation to complete, which will likely take another 10 ms as there will be a seek operation to spin the disks 58 from address S+511 to S+8,191. Similarly, when the third SCSI Extended Copy command 146(3) begins to execute, since it begins around the same time as the first two, there may be a latency of close to 30 ms, and when the last SCSI Extended Copy command 146(8) begins to execute, there may be a latency of close to 80 ms. Even when the first thread executing the first SCSI Extended Copy command 146(1) attempts to issue a second read command for the second subset having addresses ranging from S+512 through S+1023, there may be a latency as it waits for the initial reads for all of the seven other SCSI Extended Copy commands 146 complete. Thus, all of the read operations for the eight SCSI Extended Copy commands 146, although technically performed in parallel, will effectively be done serially with as much as a full random seek time in between. This may take as long as 1.28 seconds as there are 128 random seeks of 10 ms each.

In addition, once the first thread obtains the data from addresses S through S+511, it will need to write that data at target addresses T through T+511. Once the second thread obtains the data from addresses S+8,192 through S+8,703, it will need to write that data at target addresses T+8,192 through T+8,703, which are on the same target disks as the first thread. For similar reasons, the write operations are also effectively serialized with a full random seek in between. Thus, the entire set of eight SCSI Extended Copy commands 146 may take over 2.5 seconds to complete, and during this entire time, if any other thread accesses any of the disks 58 of either the logical source volume or the logical target volume, it will further slow down the eight SCSI Extended Copy commands 146.

However, if the DSS 44 were to perform the eight SCSI Extended Copy commands 146 in series rather than in parallel, fulfillment would be sped up tremendously. Since each SCSI Extended Copy command 146 is able to complete its reads before the other SCSI Extended Copy commands 146 begins its reads, there may not be any need for a random seek between reading the various subsets of each source chunk 153 (especially if read-ahead caching is used), and there may not be any need for a random seek between writing the various subsets of each target chunk 155. Thus, only 2 10-ms seek operations (one read and one write) are needed per SCSI Extended Copy command 146, for a total seek time of 160 ms for the entire set of eight SCSI Extended Copy commands 146. In addition, the data transfer time for the 32 MB of data would only take about 250 ms (assuming a transfer rate of ~128 MB per second for a typical hard disk), for a total fulfillment time of about 410 ms, which is over six times faster than if done in parallel. Furthermore, if the eight SCSI Extended Copy commands 146 are fulfilled in order by address (i.e., first SCSI Extended Copy command 146(1) is fulfilled first, followed by second SCSI Extended Copy command 146(2), etc.), the number of seek operations may be reduced even further because there will not be a need for a random seek between chunks. Thus, the total seek time may be reduced to only 20 ms, for a total fulfillment time of about 270 ms, which is over nine times faster than if done in parallel.

Thus, pattern recognition module 64 is configured to recognize that all of these eight SCSI Extended Copy commands 146 belong to a single stream 150, and policy implementation module 72 is configured to process the entire stream 150 in series. In some embodiments, particularly when the SCSI Extended Copy commands 146 are expected to arrive in a random order, policy implementation module 72 is further configured to order the fulfillment of the eight SCSI Extended Copy commands 146 within the stream 150 by address for further improvements.

Pattern recognition module 64 may be configured to recognize that these eight SCSI Extended Copy commands 146 belong to a single stream because they all contain initial source addresses 147 (or, alternatively initial target addresses 149) that are within a threshold distance (e.g., 64 MB) of each other. Typically, in the case of a 32 MB copy issued for a VM clone or migration operation, aside from the first SCSI Extended Copy command 146(1), each SCSI Extended Copy command 146 within a related stream 150 will have a source address that is no more than 32 MB after another member of the stream. Even if one of the eight SCSI Extended Copy commands 146 is not received or delayed, a 64 MB threshold will ensure that the remaining SCSI Extended Copy commands 146 are treated as a single stream 150.

In some embodiments, in addition to checking for sequential source addresses 147 or target addresses 149 within received SCSI Extended Copy commands 146, the pattern recognition module 64 may also check that the SCSI Extended Copy commands 146 are all issued from a single host 32 as part of the pattern detection.

Figure 3:
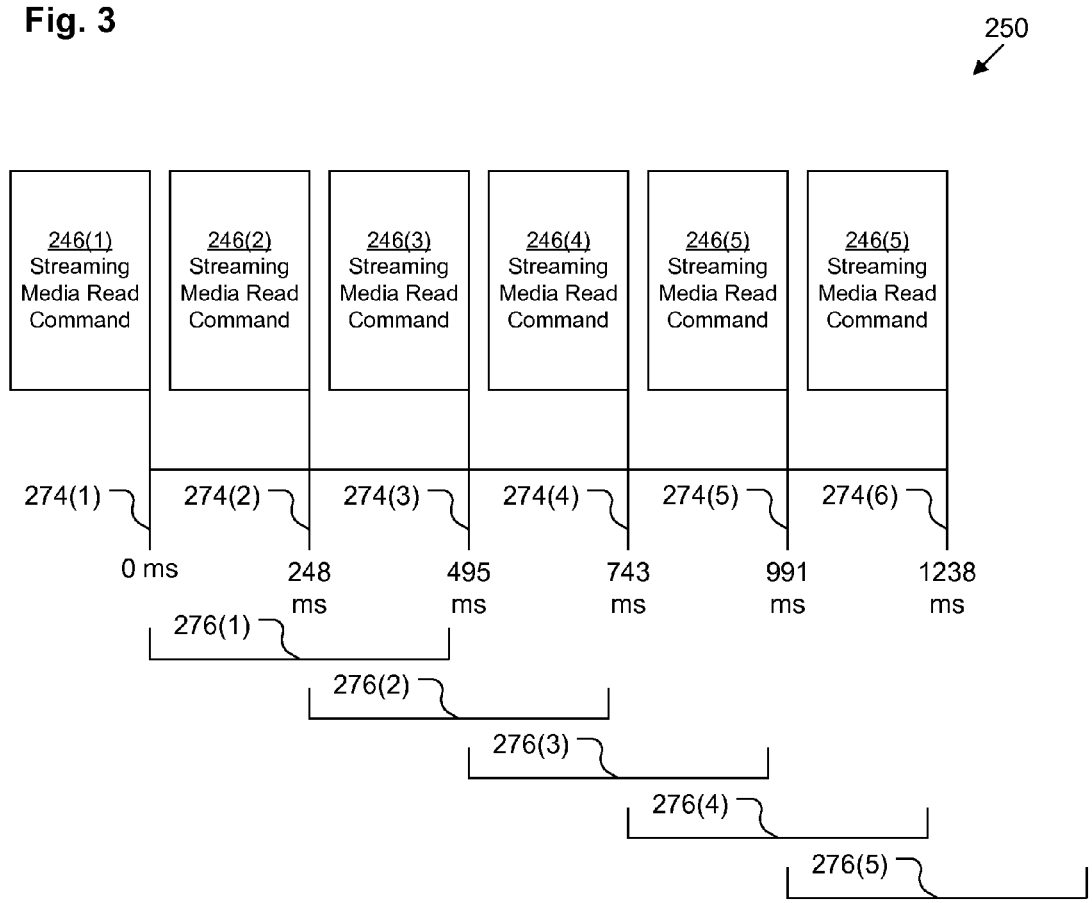
FIG. 3 is a block diagram depicting an example optimization policy for streaming media according to various embodiments.

FIG. 3 depicts another example 250 stream 50. In the context of an application 34 that streams media (e.g., audio or video) to users from DSS 44, a user may request to view a particular media stream. In order to fulfill that request, the application 34 may send a series of streaming media read commands 246(1), 246(2), 246(3), 246(4), 246(5), etc. to the DSS 44 to read sequential chunks of a media file stored on a disk 58 (or a virtual volume) of the DSS 44. Data only needs to be read from the file approximately as fast as it can be played by the user. For example, if the media file is an uncompressed stereo 24-bit 44.1 KHz audio waveform file, it may take up about 258.4 KB per second. If the application 34 is configured to request the data of the file in chunks of 64 KB, in order to keep up with the playback rate, it will need to request a new chunk approximately every 248 ms. Thus, for example, each streaming media read command 246 includes a request for 64 KB from the media file. Once a first streaming media read command 246(1) is completed (i.e., the contents of its respective 64 KB chunk have been read and sent back to the application 34) at an initial completion time 274(1) (referred to as time 0), DSS 44 has 248 ms to complete the next streaming media read command 246(2) in order to avoid any skipping (assuming that there is no buffering). However, even if the second streaming media read command 246(2) does not complete by 248 ms, as long as it completes prior to ~495 ms, there may be some benefit to its completion (i.e., the waveform data from the end of the second chunk can still be played). However, after 495 ms, there is no use in completing the second streaming media read command 246(2), since it will have been entirely skipped. Thus once stream 250 is identified, a threshold time period 276(1) may be assessed with respect to the initial completion time 274(1) to determine whether or not to fulfill the second streaming media read command 246(2). In one embodiment, the threshold time period 276(1) may be 490 ms. Thus, if the policy implementation module 72 determines that the second streaming media read command 246(2) cannot be fulfilled completely by 490 ms after the initial completion time 274(1), it may decide to skip the second streaming media read command 246(2) and move on to the third streaming media read command 246(3). Similarly, for every successfully-completed streaming media read command 246, there may be a respective threshold time period 276 assessed from its time of completion to determine whether to bother fulfilling the next streaming media read command 246 in sequence.

In some embodiments, buffering may be performed. For example, one second worth of audio may be preloaded before playback begins so that the playback is then 1 second behind the loading of data. In such embodiments, the threshold time period 276 may be much longer, e.g., the length of the buffer time (1 second in this example). After completing the fulfillment of a first streaming media command 246(1), if any of the next five streaming media commands 246(2)-246(6) cannot be completed by 1000 ms after the initial completion time 274(1), that streaming media command 246 will be skipped.

FIG. 4 illustrates an example method 300 according to various embodiments for identifying streams 50 of related I/O commands 46 received by DSS 44 and applying a special policy to the fulfillment of the related I/O commands 46 of each such stream 50.

It should be understood that any time a piece of software (e.g., I/O management application 62, pattern recognition module 64, policy implementation module 72, application 34, etc.) is described as performing a method, process, step, or function, in actuality what is meant is that a computing device (e.g., DSS 44) on which that piece of software is running performs the method, process, step, or function when executing that piece of software on its processing circuitry 54.

It should be understood that, within FIG. 4, steps 310-320 are dashed because they may be optional and not fundamental to method 300. However, it should be understood that, in some embodiments, one or more of the other steps or sub-steps may be omitted. Similarly, in some embodiments, one or more steps or sub-steps may be combined together or performed in a different order. In addition, sub-steps 332-338 are dashed because they represent alternative example implementations of step 330, and sub-steps 342-349 are dashed because they represent alternative example implementations of step 340.

In step 310, management device 38 displays a pattern/policy menu to the user 42 on a display of UI device 40. In some embodiments, management device performs step 310 at the direction of DSS 44. In some embodiments, the pattern/policy menu may be displayed graphically using a graphical user interface, while in other embodiments the pattern/policy menu may be displayed using a text-based or other kind of interface.

In step 315, in response to displaying the pattern/policy menu to the user 42, the management device 38 receives user input from the user 42, which it sends to the DSS 44 to be stored in pattern/policy DB 66. Thus, the user 42 specifies how to define a particular pattern for identifying a stream 50, and a representation thereof is stored as a pattern definition 68 within pattern/policy DB 66. In addition, the user 42 specifies how to define a particular policy for fulfilling the I/O commands 46 of the stream 50, and a representation thereof is stored as a policy definition 70 within pattern/policy DB 66.

In some embodiments, in step 310, lists of known pattern definitions 68 and policy definitions 70 may be displayed to the user 42 to be selected from in step 315. In other embodiments, once the user 42 selects a pattern definition 68 and/or a policy definition 70 in step 315, the user 42 is able to modify that pattern definition 68 or a policy definition 70. For example, the user 42 might select a pattern definition 68 that matches when SCSI Extended Copy commands 146 have source addresses 147 within 64 MB of each other, but then the user 42 may modify the selected pattern definition 68 to instead utilize a 128 MB threshold rather than a 64 MB threshold.

Steps 310 and 315 may be repeated several times in case the user 42 wishes to input several different pattern definitions 68 and associated policy definitions 70.

In some embodiments, instead of the user 42 inputting the pattern definitions 68 and associated policy definitions 70 in steps 310-315, one or more such pattern definition 68 and associated policy definition 70 may be pre-programmed into the DSS 44 (e.g., at a configuration time of the DSS 44). In some of these embodiments, the pattern definition 68 and associated policy definition 70 is pre-stored in pattern/policy DB 66, while in other embodiments, instead of being placed in a pattern/policy DB 66, the pattern definition 68 is hard-coded into the logic of the pattern recognition module 64, and the policy definition 70 is hard-coded into the logic of the policy implementation module 72.

In step 320, the I/O management application 62 running on the DSS 44 receives a set 48 of data storage commands 46 via the network interface circuitry 52 over network 36 from one or more hosts 32 directed at the DSS 44. As operation of I/O management application 62, the data storage commands 46 within the set 48 may change. Generally, once a data storage command 46 is fulfilled, it disappears from the set 48.

In step 330, pattern recognition module 64 identifies that a subset of the set 48 of received data storage commands 46 satisfies a pre-defined pattern, yielding an identified stream 50 of related storage commands 46. In some embodiments, pattern recognition module 64 is hard-coded with a particular pattern to look for, while in other embodiments, pattern recognition module 64 searches for patterns based on pattern definitions 68 stored within pattern/policy DB 66.

Some particular patterns of note that may define a stream 50 are mentioned in sub-steps 332-338.

In sub-step 332, pattern recognition module 64 identifies that a subset of the set 48 of received storage commands 46 makes up a stream 50 if one or more storage commands 46 has a source address 147 or a target address 149 that falls within a logical address threshold of another storage command 46 within the set 48. In one embodiment, for the pattern to be satisfied, the storage commands 46 are SCSI Extended Copy commands 146, and the threshold is in the range of 32 MB to 128 MB (e.g., 64 MB). In another embodiment, for the pattern to be satisfied, the storage commands 46 are read commands and the threshold is much smaller, in the range of 8 KB to 256 KB (e.g., 64 KB). In some of these embodiments, in addition to satisfying a small threshold distance, for the pattern to be satisfied, a marker must appear within each storage command 46 of the stream 50. For example, in the case of streaming media, a media streaming application 34 may place a streaming media marker within a certain field of a read command, and only such marked read commands are considered to be part of the stream if they relate to other such commands within a small threshold distance.

In sub-step 334, pattern recognition module 64 identifies that a subset of the set 48 of received storage commands 46 makes up a stream 50 if several storage commands 46 are received from a same host 32 or a same application 34. In one embodiment, for this pattern to be satisfied, the storage commands 46 from the same host 32 or application 34 are SCSI Extended Copy commands 146 and a distance threshold in the range of 32 MB to 128 MB is used (see sub-step 332). In another embodiment, for this pattern to be satisfied, the storage commands 46 from the same host 32 or application 34 are read commands and a distance threshold in the range of 8 KB to 256 KB is used (see sub-step 332).

In sub-step 336, pattern recognition module 64 identifies that a subset of the set 48 of received storage commands 46 makes up a stream 50 if a storage command 46 has a target address on a disk 58 or logical volume that is marked as being either used for streamable media or compressed or sensitive and subject to encryption. In the case of a volume used for streamable media, the pattern may only be satisfied in the case of storage commands 46 which are read commands.

In sub-step 338, pattern recognition module 64 identifies that a subset of the set 48 of received storage commands 46 makes up a stream 50 if a storage command 46 is received from a particular host 32 or application 34 that is known or marked to be either associated with compressed or sensitive/encrypted data or that is known or marked to be associated with streaming media. In the case of a host 32 or application 34 used for streaming media, the pattern may only be satisfied in the case of storage commands 46 which are read commands.

In step 340, policy implementation module 72 applies a policy associated with the identified pattern from step 330 to fulfillment of the storage commands 46 of the stream 50. In some embodiments, policy implementation module 72 is hard-coded with a particular policy to apply to the storage commands 46 of the stream 50 identified by the pattern recognition module 64, while in other embodiments, policy implementation module 72 applies policies based on policy definitions 70 stored within pattern/policy DB 66 in connection with the pattern definition 68 that matched the stream 50 in step 330. Some particular policies of note that may be applied to a stream 50 are mentioned in sub-steps 342-349.

In sub-step 342, policy implementation module 72 serializes the storage commands 46 of the stream 50. Thus, each storage command 46 of the stream 50 is only performed once a previous storage command of the stream 50 completes. This policy is typically applied in the case of a stream 50 of SCSI Extended Copy Commands 146 that contain source addresses 147 (or target addresses 149) that fall within a threshold of each other (e.g., in the range of 32 MB to 128 MB) as identified in sub-step 332. As an extension of sub-step 342, in sub-step 344, the various SCSI Extended Copy Commands 146 are performed in the order of their respective source addresses 147 (or target addresses 149).

In sub-step 346, policy implementation module 72 cancels read commands of the stream 50 that cannot complete within a threshold time period 276 (e.g., within the range of 30 ms to 10 seconds) of one or more previous read commands of the stream 50 (see FIG. 3). This policy is typically applied in the case of a stream 50 identified as streaming media. For example, if the commands are read commands that are within a small threshold distance of each other (see sub-step 332) possibly with the storage commands having a special streaming media marker. As another example, sub-step 346 may be applied if the stream 50 was identified as being streaming media by its storage commands 46 having been identified as being directed at a volume used for storing streamable media (see sub-step 336) or as coming from a streaming media host 32 (see sub-step 338).

In sub-step 348, policy implementation module 72 cryptographically processes storage commands of the stream 50. This policy is typically applied in the case of a stream 50 identified as relating to a sensitive volume or host as identified in sub-steps 336 and 338. Policy implementation module 72 decrypts read commands within the stream 50 and encrypts write commands within the stream 50.

In sub-step 349, policy implementation module 72 processes storage commands of the stream 50 using compression or decompression. This policy is typically applied in the case of a stream 50 identified as relating to a compressed volume or compression-utilizing host as identified in sub-steps 336 and 338. Policy implementation module 72 decompresses read commands within the stream 50 and compresses write commands within the stream 50.

Thus, embodiments have been described for identifying streams 50 of related data storage operations 46 and applying specialized policies to those streams 50. In some situations this may allow for optimized performance (e.g., serialization of SCSI Extended Copy operations and cancelation of streaming media reads that cannot complete in time), while in others it may allow for flexibility in features (e.g., performing encryption/decryption and compression/decompression).

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Finally, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. §102 or 35 U.S.C. §103, such determination being a legal determination that depends upon many factors, not all of which are known to Applicants at this time.

What is claimed is:

1. A method performed by a data storage system, the method comprising:
   receiving a set of data storage commands directed to the data storage system;
   identifying that a subset of the set of received data storage commands satisfies a pre-defined pattern; and
   in response to identifying, applying a policy associated with the pre-defined pattern to fulfillment of the data storage commands of the subset; wherein:
   the data storage system is configured to execute multiple data storage commands in parallel;
   identifying that the subset of the set of received data storage commands satisfies the pre-defined pattern includes identifying that the data storage commands of the subset belong to a single stream of related commands;
   applying the policy includes executing the data storage commands of the subset in series rather than in parallel with each other; and identifying that the data storage commands of the subset belong to a single stream of related commands includes determining that a logical block address of each data storage command of the subset is within a threshold distance of a logical block address of another data storage command of the subset.

2. The method of claim 1 wherein applying the policy further includes ordering the data storage commands of the subset by logical block addresses for serial execution.

3. The method of claim 1 wherein the threshold distance is in the range of 32 megabytes to 128 megabytes.

4. The method of claim 1 wherein identifying that the data storage commands of the subset belong to a single stream of related commands further includes determining that the data storage commands of the subset are from a single host.

5. The method of claim 1 wherein identifying that the data storage commands of the subset belong to a single stream of related commands further includes determining that each data storage command of the subset is an extended copy command identifying a sequential set of logical block addresses.

6. The method of claim 5 wherein identifying that the data storage commands of the subset belong to a single stream of related commands further includes determining that each data storage command of the subset is a read command.

7. The method of claim 1 wherein the predefined pattern and the policy associated with that pattern were pre-programmed into the data storage system upon initial configuration of the data storage system.

8. The method of claim 1 wherein the method further comprises, prior to receiving the set of data storage commands:
displaying a menu to a user; and
receiving user input in response to displaying the menu, the user input specifying the predefined pattern and the policy associated with that pattern.

9. A method performed by a data storage system, the method comprising:
receiving a set of data storage commands directed to the data storage system;
identifying that a subset of the set of received data storage commands satisfies a pre-defined pattern; and
in response to identifying, applying a policy associated with the pre-defined pattern to fulfillment of the data storage commands of the subset; wherein:
the data storage system is configured to execute multiple data storage commands in parallel;
identifying that the subset of the set of received data storage commands satisfies the pre-defined pattern includes identifying that the data storage commands of the subset are read commands that relate to a single media stream; and
applying the policy includes canceling a read command of the subset that cannot be completed within a predefined threshold time after a previous read command of the subset has been completed.

10. The method of claim 9 wherein the predefined threshold time is in the range of 30 milliseconds to 10 seconds.

11. The method of claim 9 wherein identifying that the data storage commands of the subset are read commands that relate to a single media stream includes:
determining that a logical block address of each data storage command of the subset is within a threshold distance of a logical block address of a previously-received data storage command of the subset; and
determining that each data storage command of the subset is directed to a particular area of storage dedicated to media streaming.

12. The method of claim 9 wherein identifying that the data storage commands of the subset are read commands that relate to a single media stream includes:
determining that a logical block address of each data storage command of the subset is within a threshold distance of a logical block address of a previously-received data storage command of the subset; and
determining that each data storage command of the subset is from a particular host dedicated to media streaming.

13. The method of claim 9 wherein identifying that the data storage commands of the subset are read commands that relate to a single media stream includes:
determining that a logical block address of each data storage command of the subset is within a threshold distance of a logical block address of a previously-received data storage command of the subset; and
determining that each data storage command of the subset includes a marker indicative of media streaming.

14. The method of claim 9 wherein the predefined pattern and the policy associated with that pattern were pre-programmed into the data storage system upon initial configuration of the data storage system.

15. The method of claim 9 wherein the method further comprises, prior to receiving the set of data storage commands:
displaying a menu to a user; and
receiving user input in response to displaying the menu, the user input specifying the predefined pattern and the policy associated with that pattern.

16. A computer program product comprising a non-transitory computer-readable medium storing a set of instructions, which, when executed by a data storage system cause the data storage system to:
receive a set of data storage commands directed to the data storage system;
identify that a subset of the set of received data storage commands satisfies a pre-defined pattern; and
in response to identifying, apply a policy associated with the pre-defined pattern to fulfillment of the data storage commands of the subset;
wherein:
the data storage system is configured to execute multiple data storage commands in parallel;
identifying that the subset of the set of received data storage commands satisfies the pre-defined pattern includes identifying that the data storage commands of the subset belong to a single stream of related commands;
applying the policy includes executing the data storage commands of the subset in series rather than in parallel with each other; and
identifying that the data storage commands of the subset belong to a single stream of related commands includes determining that a logical block address of each data storage command of the subset is within a threshold distance of a logical block address of another data storage command of the subset.

17. The computer program product of claim 16 wherein identifying that the data storage commands of the subset belong to a single stream of related commands further includes determining that each data storage command of the subset is an extended copy command identifying a sequential set of logical block addresses.

18. An apparatus comprising:
network interface circuitry for connecting to a network;
a persistent data storage device;
memory; and
processing circuitry coupled to the memory, the processing circuitry being configured to:
  execute multiple data storage commands in parallel;
  receive a set of data storage commands directed to the persistent data storage device;
  identify that a subset of the set of received data storage commands satisfies a pre-defined pattern; and
  in response to identifying, apply a policy associated with the pre-defined pattern to fulfillment of the data storage commands of the subset; wherein:
identifying that the subset of the set of received data storage commands satisfies the pre-defined pattern includes identifying that the data storage commands of the subset belong to a single stream of related commands;
applying the policy includes executing the data storage commands of the subset in series rather than in parallel with each other; and
identifying that the data storage commands of the subset belong to a single stream of related commands includes determining that a logical block address of each data storage command of the subset is within a threshold distance of a logical block address of another data storage command of the subset.

19. The apparatus of claim 18 wherein identifying that the data storage commands of the subset belong to a single stream of related commands further includes determining that each data storage command of the subset is an extended copy command identifying a sequential set of logical block addresses.

20. A computer program product comprising a non-transitory computer-readable medium storing a set of instructions, which, when executed by a data storage system cause the data storage system to:
  receive a set of data storage commands directed to the data storage system;
  identify that a subset of the set of received data storage commands satisfies a pre-defined pattern; and
  in response to identifying, apply a policy associated with the pre-defined pattern to fulfillment of the data storage commands of the subset;
wherein:
  the data storage system is configured to execute multiple data storage commands in parallel;
  identifying that the subset of the set of received data storage commands satisfies the pre-defined pattern includes identifying that the data storage commands of the subset are read commands that relate to a single media stream; and
  applying the policy includes canceling a read command of the subset that cannot be completed within a predefined threshold time after a previous read command of the subset has been completed.

21. An apparatus comprising:
network interface circuitry for connecting to a network;
a persistent data storage device;
memory; and
processing circuitry coupled to the memory, the processing circuitry being configured to:
  execute multiple data storage commands in parallel;
  receive a set of data storage commands directed to the persistent data storage device;
  identify that a subset of the set of received data storage commands satisfies a pre-defined pattern; and
  in response to identifying, apply a policy associated with the pre-defined pattern to fulfillment of the data storage commands of the subset wherein:
identifying that the subset of the set of received data storage commands satisfies the pre-defined pattern includes identifying that the data storage commands of the subset are read commands that relate to a single media stream; and
applying the policy includes canceling a read command of the subset that cannot be completed within a predefined threshold time after a previous read command of the subset has been completed.

* * * * *